United States Patent
Wirtanen

(10) Patent No.: US 6,745,875 B2
(45) Date of Patent: Jun. 8, 2004

(54) ARRANGEMENT FOR CONNECTING A BRAKE DISC ON A DRIVER

(75) Inventor: Anders Wirtanen, Sodertalje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/296,025

(22) PCT Filed: May 21, 2001

(86) PCT No.: PCT/SE01/01130
§ 371 (c)(1),
(2), (4) Date: Nov. 20, 2002

(87) PCT Pub. No.: WO01/92751
PCT Pub. Date: Dec. 6, 2001

(65) Prior Publication Data
US 2003/0111303 A1 Jun. 19, 2003

(30) Foreign Application Priority Data
Jun. 2, 2000 (SE) .............................................. 0002055

(51) Int. Cl.[7] .................................................. B60T 1/06
(52) U.S. Cl. ................................................ 188/218 XL
(58) Field of Search .................. 188/218 XL, 18 A, 188/218 R

(56) References Cited
U.S. PATENT DOCUMENTS

| | | | | |
|---|---|---|---|---|
| 5,150,774 A | * | 9/1992 | Adamson | 188/218 XL |
| 5,190,124 A | * | 3/1993 | Haneda | 188/218 XL |
| 5,309,620 A | | 5/1994 | Shinohara et al. | |
| 5,437,351 A | | 8/1995 | Lindner | |
| 6,446,765 B1 | * | 9/2002 | Dabertrand et al. | 188/18 A |
| 6,467,588 B1 | * | 10/2002 | Baumgartner et al. | 188/218 XL |

FOREIGN PATENT DOCUMENTS

| | | |
|---|---|---|
| WO | 97/20151 | 6/1997 |
| WO | WO 200014424 A1 * | 3/2000 |

* cited by examiner

Primary Examiner—Jack Lavinder
Assistant Examiner—Melanie Torres
(74) Attorney, Agent, or Firm—Ostrolenk, Faber, Gerb & Soffen, LLP

(57) ABSTRACT

For releaseable fastening of an annular brake disc on the periphery of a rotatable brake disc carrier, the internal periphery of the brake disc has radially inwardly projecting protrusions and the external periphery of the carrier has grooves receiving the protrusions, wherein the protrusions and grooves are dimensioned circumferentially to provide a spacing gap between each protrusion and a ridge defining its groove. A spacing stem removeably disposed in one of the spacing gaps to fix the disc to the carrier. Axially opposite ends of the stem have shoulders which prevent mutual axial movement between the brake disc and the carrier.

14 Claims, 2 Drawing Sheets

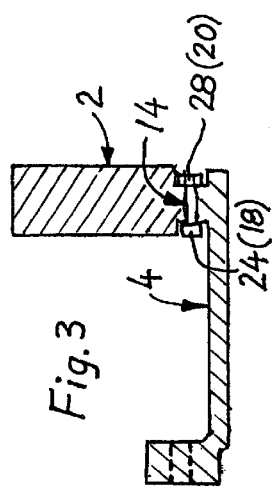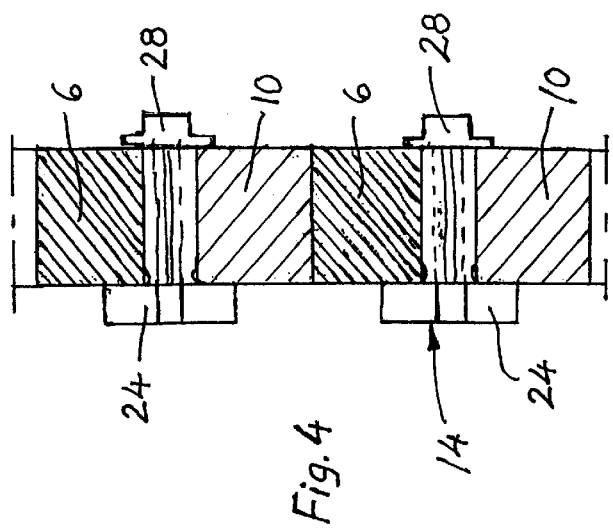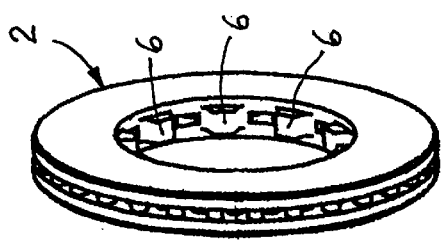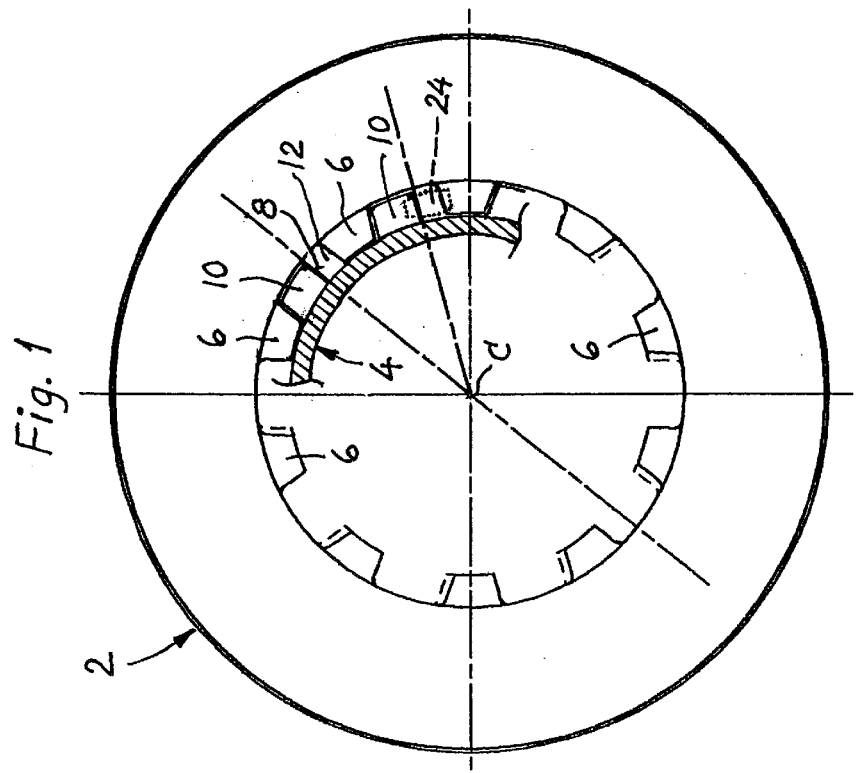

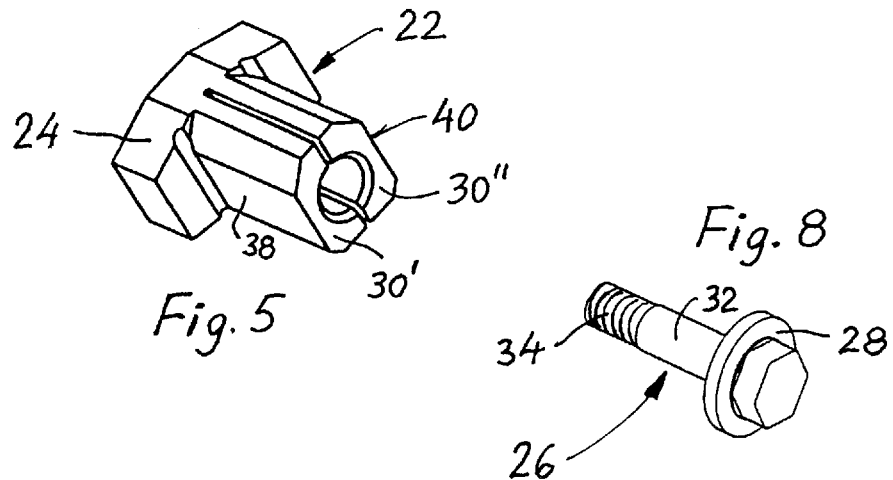
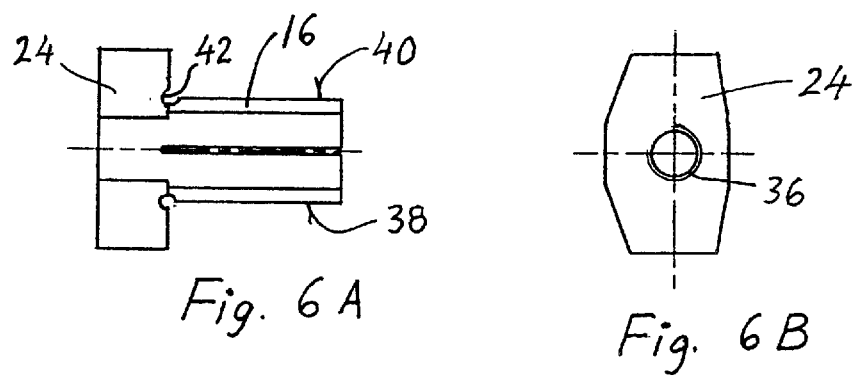
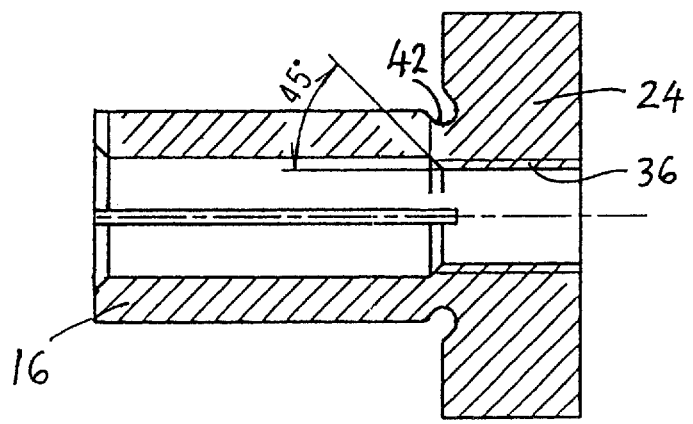

ARRANGEMENT FOR CONNECTING A BRAKE DISC ON A DRIVER

BACKGROUND OF THE INVENTION

The present invention relates to an arrangement connecting a vehicle brake disc on a carrier and for providing relative movement between them.

The invention thus concerns an arrangement for releasable fastening of an annular vehicle brake disc to a rotatable carrier which supports the brake disc. The carrier may be a wheel hub or a sleeve-shaped extension which is fastened to and protrudes axially from a wheel hub. The internal periphery of the brake disc is provided with driving protrusions which are separated in the circumferential direction, face radially inwards towards the centre of the disc and engage in a corresponding number of external axial grooves between ridges which run axially on the outside of the carrier. In other words, the brake disc is fitted to the carrier by means of a splined connection.

STATE OF THE ART

Vehicle brake discs which are fitted to and rotate jointly with a wheel hub provided with external splines, or some other kind of brake disc carrier, have a definite tendency to gradually rust fast to the wheel hub or carrier after certain time in operation on a vehicle. This may often result in it being very difficult or totally impossible to detach brake discs from the hub or carrier. There has hitherto been no easy and reliable way of solving this well-known problem of rusted-on brake discs.

An example of known technology which may be cited with regard to brake disc fastening is international patent publication WO 97/20151 (PCT/EP96/04948) which describes a brake disc/hub connection whereby a brake disc is releasably connected to a wheel hub, particularly in the case of disc brakes of commercial vehicles. The internal periphery region of the brake disc is provided with supporting elements, and the wheel hub has chambers on its outer periphery. At the same time, special intermediate elements are arranged for torque and force transmission from the hub's chambers to the brake disc's supporting elements. The intermediate elements are so designed that the wheel hub's chambers engage in them. The intermediate elements engage in turn in the supporting elements and their shape results in their bearing, in the circumferential direction, on the supporting elements. The chambers are also connected by shape and/or force to the intermediate elements. However, this relatively complicated type of connection arrangement between brake disc and hub does not solve the rusting-on problem in an entirely reliable manner, nor does it afford the manufacturing advantages of a splined connection.

OBJECT OF THE INVENTION

The object of the invention is to solve the aforesaid problem, which arises when trying to remove brake discs, by providing a new type of brake disc fastening which effectively eliminates the risk of brake discs rusting fast such that it becomes impossible or extraordinarily difficult to detach them from the carrier or hub.

For, among others, service and maintenance reasons, it is extraordinarily important to be able to carry out necessary brake disc changing quickly and easily and without needing special tools.

SUMMARY OF THE INVENTION

The aforesaid object is achieved according to the invention by an arrangement including a brake disc on a carrier as described above, with a measure to avoid the effect of rusting.

A primary distinguishing feature of the fastening arrangement according to the invention is that the brake disc's driving protrusions are of smaller extent in the circumferential direction of the carrier than the width of the grooves in their circumferential direction, so that it is possible for there to be between adjacent sets of mutually engaging driving protrusions and grooves a spacing gap to accommodate a spacing device removably fastened therein. This spacing device is so designed as to fit into and fill the spacing gap and hence fix the brake disc relative to the carrier. At its axially opposite ends the spacing device is also provided with shoulder portions to prevent mutual axial movement between the brake disc and the carrier (the hub).

When the time comes to replace the brake disc fitted to the carrier with a new brake disc and rusting-on ("chemical rust connection") is found to have occurred between the brake disc and the spacing devices inserted in the gaps between the driving protrusions and the carrier grooves, the first step is to remove the shoulder portions at one end of the spacing devices. Thereafter the spacing devices can be removed without difficulty from the spacing gaps between the brake disc driving protrusions and the carrier ridges.

The fastening arrangement according to the invention may further afford various functional and manufacturing advantages.

For both fitting and removal of the spacing devices to be easy to carry out, it may be advantageous to adopt a version whereby each spacing device incorporates not only a preferably substantially T-shaped spacing element with a stem and a transverse head which constitutes one of the two shoulder portions and is intended to abut against a first side of the brake disc and the carrier, but also a shoulder element which is fastenable in the stem of the spacing element, comprises the second shoulder portion and is intended to abut against an opposite second side of the brake disc and the carrier.

Removing a spacing device, i.e. extracting the device from the spacing gap in which it is inserted, involves first detaching the shoulder element from the stem of the spacing element, followed by removing the spacing element from the spacing gap.

A particularly simple version is distinguished by the T-shaped spacing element having a hollow stem which is substantially prismatic or cylindrical on the outside and by the fastenable shoulder element consisting of a locking screw which is screwable into the hollow stem of the spacing element and which has a screw head which constitutes the second shoulder portion. In this case the two shoulder portions of the spacing device are thus respectively the transverse T-head of the spacing element and the head of the locking screw.

To optimise the possibility of detaching the spacing device from the spacing gap even when the spacing device has rusted fast to the brake disc, it may be particularly advantageous for the hollow stem of the spacing element to be split axially into two parallel stem halves which may then be pressed together when the locking screw has been removed (unscrewed) from the hollow stem of the spacing element. Pressing the stem halves together has the effect of somewhat reducing the transverse dimension of the stem, thus greatly facilitating the removal of the spacing element from the spacing gap.

To reduce the risk of the locking screw rusting fast in the hollow shaft of the spacing element, it may be advantageous for the locking screw to have a stem with external thread on only the outermost portion of the length of the stem, and for the spacing element to be provided with a corresponding internal thread on only its transverse T-head.

As an alternative to a spacing element with a hollow stem and a locking screw screwable into it, a version is also conceivable whereby the fastenable shoulder element takes the form of a cylindrical pin which is screwable into the hollow stem of the spacing element and which is provided, in its outer end situated outside the outside of the brake disc/carrier, with a positionally fixed locking device which then constitutes the second shoulder portion. This locking device may for example be a split-pin running through the pin, or a locking ring or lock washer inserted in a circumferential recess on the outside of the end of the cylindrical pin.

To minimise any risk of the spacing devices rusting fast to the brake disc, it is of course best of all if both the spacing element and the shoulder element fastenable in it are made of a material which tends not to rust, e.g. stainless steel.

BRIEF DESCRIPTION OF THE DRAWINGS

The arrangement for brake disc fastening according to the invention will now be explained in more detail and exemplified with reference to an embodiment depicted in the attached drawings, which are as follows:

FIG. 1 depicts in side view and partial cross-section a brake disc placed on a carrier;

FIG. 2 depicts the brake disc according to FIG. 1 viewed in perspective on a smaller scale;

FIG. 3 depicts in axial longitudinal section parts of a carrier with a brake disc fastened to it;

FIG. 4 depicts on a larger scale and in expanded peripheral section part of the engagement region between brake disc and carrier;

FIG. 5 depicts in perspective a T-shaped spacing element belonging to a spacing device according to the invention;

FIGS. 6a–6b depict in side and end views respectively the spacing element according to FIG. 5;

FIG. 7 depicts on a larger scale than FIG. 6a an axial longitudinal section through the spacing element; and FIG. 8 depicts in perspective a locking screw which belongs to a spacing device according to the invention and is intended to be screwed into a spacing element according to FIGS. 5–7.

DESCRIPTION OF AN EMBODIMENT OF A FASTENING ARRANGEMENT AND RELATING PARTS

Reference will first be made to FIG. 14 which depict parts of an embodiment of a fastening arrangement according to the invention.

The arrangement is intended for releasable fastening of an annular brake disc 2 to a rotatable brake disc carrier 4 which supports the brake disc. On its internal periphery the brake disc 2 is provided with ten driving protrusions 6 which are separated in the circumferential direction, face radially inwards towards the centre C of the disc and engage in a corresponding number of external axial grooves 8 between ridges 10 which run axially on the outside of the carrier 4.

The extent of the driving protrusions 6 in the circumferential direction of the carrier 4 being smaller than the width of the grooves 8 in the same circumferential direction means that there is between adjacent sets of mutual engaging drive protrusions 6 and grooves 8 a spacing gap 12 intended to accommodate a spacing device 14 fastened removably therein (see FIGS. 3–4). The spacing device 14 is so dimensioned that its stem 16 fits into and fills the spacing gap 12, thereby fixing the brake disc 2 to the carrier 4. The two axially opposite ends of the spacing device 14 are provided with shoulder portions 18, 20 which prevent mutual axial movement between the brake disc 2 and the carrier 4.

Each such spacing device 14 partly comprises a spacing element 22 which incorporates a stem 16 and has a transverse head 24 at one end of the stem 16. The spacing device 14 also includes a shoulder element 26 which is fastenable in the stem 16 of the spacing element 22 and which in the case depicted takes the form of a locking screw which is screwable into a hollow stem 16 of the spacing element 22 and which has a screw head 28 which constitutes the second shoulder portion 20. The transverse head 24 of the spacing element 22 constitutes on its side the first shoulder portion 18. The head 24 of the spacing element 22 is designed to abut against a first side of the brake disc 2 and the carrier 4, while the head 28 of the locking screw is designed to abut against the opposite side of the brake disc 2 and the carrier 4.

As may best be seen in FIG. 5, the T-shaped spacing element 22 has a hollow stem 16 which is substantially prismatic on the outside. As further indicated in FIGS. 5–7, the hollow stem 16 of the spacing element 22 is split axially into two parallel stem halves 30' and 30". This stem version makes possible a certain pressing together of the two stem halves after the locking screw 26 has been unscrewed from the hollow stem 16 of the spacing element 22.

As indicated by FIG. 8, the locking screw 26 has a stem 32 with an external thread 34 on at least the outermost third of the length of the stem. In a corresponding manner, the spacing element 22 has a corresponding internal thread 36 in its transverse head 24 only.

The spacing element 22 depicted in FIGS. 5–7 has a hollow stem 16 which is prismatic on the outside so that the stem exhibits two parallel contact surfaces 38, 40 intended to abut against the respective cooperating planar surfaces of adjacent driving protrusions 6 and carrier ridges 10.

The shoulder element fastenable in the T-shaped spacing element 22 may, as described above, consist of the locking screw 26 depicted in FIG. 8. As an alternative to this locking screw it is possible, for example, to use a cylindrical pin (not depicted) which is screwable into the hollow stem 16 of the spacing element 22. In that case the cylindrical pin is provided, in its outer end situated outside the respective outsides of the brake disc 2 and the carrier 4, with a positionally fixed locking device which forms the head 28 of the locking screw 26 corresponding to the second shoulder portion 20. This positionally fixed locking device may for example be a split-pin running diametrically through the pin, or a locking ring or lock washer inserted in a circumferential groove on the outside of the cylindrical pin. Both the spacing element 22 and the shoulder element fastenable in it, e.g. the locking screw 26, are preferably made of stainless steel or some other material not tending to rust. Finally it may be mentioned that the spacing element 22 may be provided with parallel recesses 42 in the transitional angle regions between the T-head 24 and the mutually parallel contact surfaces 38, 40 on the stem 16. This improves the flexibility of the parallel stem halves 30' 30", which is important for making possible the necessary pressing together of the stem halves to make it easier to remove the T-shaped spacing element 22 from the spacing gap 12 in cases where rusting fast has taken place.

What is claimed is:

1. An arrangement for releaseably fastening an annular brake disc to a rotateable brake disc carrier which supports the brake disc to rotate together with the carrier, the arrangement comprising:

the annular brake disc having an internal periphery, a plurality of driving protrusions facing radially inwardly from the internal periphery which are arrayed around the internal periphery and are separated from each other in the circumferential direction;

the brake disc carrier having an external periphery, a plurality of external, axial grooves running axially on the external periphery of the carrier and also extending in the axial direction; ridges at the external periphery of the carrier defining the grooves in the carrier;

the grooves in the carrier and the protrusions on the disc are respectively so positioned that the protrusions engage in the grooves;

the circumferential widths of the protrusions and of the grooves are related such that a spacing gap is defined between a protrusion and one of the respective adjacent ridges defining the groove in which the protrusion is disposed;

a spacing device removeably disposed in at least one of the spacing gaps, the spacing device being sized in the circumferential direction with respect to the spacing gap and with respect to the size and shapes of the driving protrusion and the respective groove in which the protrusion is disposed, to fix the brake disc relative to the carrier in the circumferential direction.

2. The arrangement of claim 1, wherein each groove has a greater circumferential width than the respective protrusion in the groove, thereby defining a respective spacing gap between each protrusion and one of the ridges of the respective groove in which the protrusion is disposed.

3. The arrangement of claim 1, wherein the spacing device has axially opposite ends with elements thereon that are shaped and positioned to prevent relative axial movement between the brake disc and the carrier.

4. The arrangement of claim 1, wherein the spacing device has axially opposite ends with shoulders thereon which engage the carrier and the brake disc and prevent relative axial movement between the brake disc and the carrier.

5. The arrangement of claim 4, wherein the spacing device comprises a substantially T-shaped spacing element including:

a stem extending through the spacing gap, the stem having first and second ends, a transverse head at the first end of the stem and defining one of the shoulders for abutting against a first axial side of the brake disc and the carrier;

a second shoulder fastenable to the second end of the stem;

the stem being of such length and the shoulders being so positioned that the second shoulder abuts a second axial side of the brake disc and the carrier opposite the first axial side thereof.

6. The arrangement of claim 5, wherein the stem of the spacing element is hollow and has an opening therein for receiving a locking screw; the second shoulder comprises a locking screw screwable into the hollow of the hollow stem through the opening therein, the locking screw having a head which defines the second shoulder.

7. The arrangement of claim 6, wherein the hollow stem has a peripheral shape that is either prismatic or cylindrical.

8. The arrangement of claim 6, wherein the locking screw includes a stem having a length with an outermost third and an external thread defined on the outermost third of the length of the stem; a corresponding internal thread in the spacing element at least in the transverse head thereof for receiving the thread of the stem of the locking screw.

9. The arrangement of claim 6, wherein the hollow stem of the spacing element is split axially defining parallel stem parts that extend along the length of the spacing element and are shaped to permit pressing together of the stem parts for enabling the transverse dimension of the stem to be reduced for enabling removal of the stem of the spacing element from the spacing gap.

10. The arrangement of claim 9, wherein the hollow stem of the spacing element is split axially into two parallel stem halves.

11. The arrangement of claim 9, wherein the locking screw includes a stem having a length with an outermost third and an external thread defined on the outermost third of the length of the stem; a corresponding internal thread in the spacing element at least in the transverse head thereof for receiving the thread of the stem of the locking screw.

12. The arrangement of claim 5, wherein the T-shaped spacing element includes a hollow stem, the second shoulder fastenable to the hollow stem comprises a cylindrical pin, and the spacing element having a hollow shaft into which the cylindrical pin is screwable; a position fixing locking device attached to the cylindrical pin axially outside the brake disc and carrier and defining the second shoulder.

13. The arrangement of claim 5, wherein the spacing element and elements defining the shoulders are comprised of a material which tends not to rust.

14. An arrangement for releaseably fastening an annular brake disc to a rotateable brake disc carrier which supports the brake disc to rotate together with the carrier, the arrangement comprising:

the annular brake disc having an internal periphery; the brake disc carrier having an external periphery; radially directed protrusions arrayed in the circumferential direction on one of the peripheries, cooperating axially extending ridges arrayed in the circumferential direction on the other of the peripheries, the ridges defining grooves on the other of the peripheries, and the protrusions protruding into the grooves;

the circumferential widths of the protrusions and of the grooves are related such that a spacing gap is defined between a protrusion and one of the respective adjacent ridges defining the groove in which the protrusion is disposed;

a spacing device removeably disposed in at least one of the spacing gaps, the spacing device being sized in the circumferential direction with respect to the spacing gap and with respect to the sizes and shapes of the driving protrusion and the respective groove in which the protrusion is disposed, to fix the brake disc relative to the carrier in the circumferential direction.

* * * * *